(12) United States Patent
Sata et al.

(10) Patent No.: US 7,944,631 B2
(45) Date of Patent: May 17, 2011

(54) LENS ACTUATOR, LENS UNIT USING THE LENS ACTUATOR AND METHOD FOR MANUFACTURING THE LENS UNIT

(75) Inventors: Norifumi Sata, Hyogo (JP); Shinsuke Kimoto, Osaka (JP); Takefumi Inoue, Nara (JP); Takuo Osaki, Osaka (JP)

(73) Assignee: Panasonic Corporation, Osaka (JP)

( * ) Notice: Subject to any disclaimer, the term of this patent is extended or adjusted under 35 U.S.C. 154(b) by 19 days.

(21) Appl. No.: 12/500,146

(22) Filed: Jul. 9, 2009

(65) Prior Publication Data

US 2010/0007973 A1 Jan. 14, 2010

(30) Foreign Application Priority Data

Jul. 9, 2008 (JP) ................................. 2008-178815

(51) Int. Cl.
*G02B 7/02* (2006.01)
(52) U.S. Cl. ...................................................... 359/819
(58) Field of Classification Search ........... 359/819–826
See application file for complete search history.

(56) References Cited

U.S. PATENT DOCUMENTS

| 7,457,061 | B2 | 11/2008 | Sata et al. | |
|---|---|---|---|---|
| 2006/0181632 | A1* | 8/2006 | Makii et al. | 348/335 |
| 2008/0259467 | A1* | 10/2008 | Chung | 359/814 |

FOREIGN PATENT DOCUMENTS

JP 2008-032768(A) 2/2008

* cited by examiner

*Primary Examiner* — Darryl J Collins
(74) *Attorney, Agent, or Firm* — RatnerPrestia (57) ABSTRACT

A lens actuator has a carrier, a cover, a first spring, a second spring, a coil, and a magnet. The carrier with a cylindrical shape is provided with a hollow section formed along a first direction, and has a holding section formed on one side of the first direction. The hollow section has a shape configured to mount a lens barrel therein. The cover, which is disposed on the side having the holding section of the carrier, has a supporting section that meets with the holding section of the carrier. The first spring and the second spring make a resilient contact with each of both surfaces in the first direction of the carrier. The coil is circumferentially disposed on the carrier so as to face the magnet. Of the coil and the magnet, one is mounted on the carrier and the other is disposed on the outer or the inner periphery of the carrier.

10 Claims, 6 Drawing Sheets

LENS ACTUATOR, LENS UNIT USING THE LENS ACTUATOR AND METHOD FOR MANUFACTURING THE LENS UNIT

BACKGROUND OF THE INVENTION

1. Field of the Invention

The present invention relates to a lens actuator mainly used for a camera and a mobile phone. The present invention also relates to a lens unit using the lens actuator and a method for manufacturing the lens unit.

2. Background Art

Figure 6:
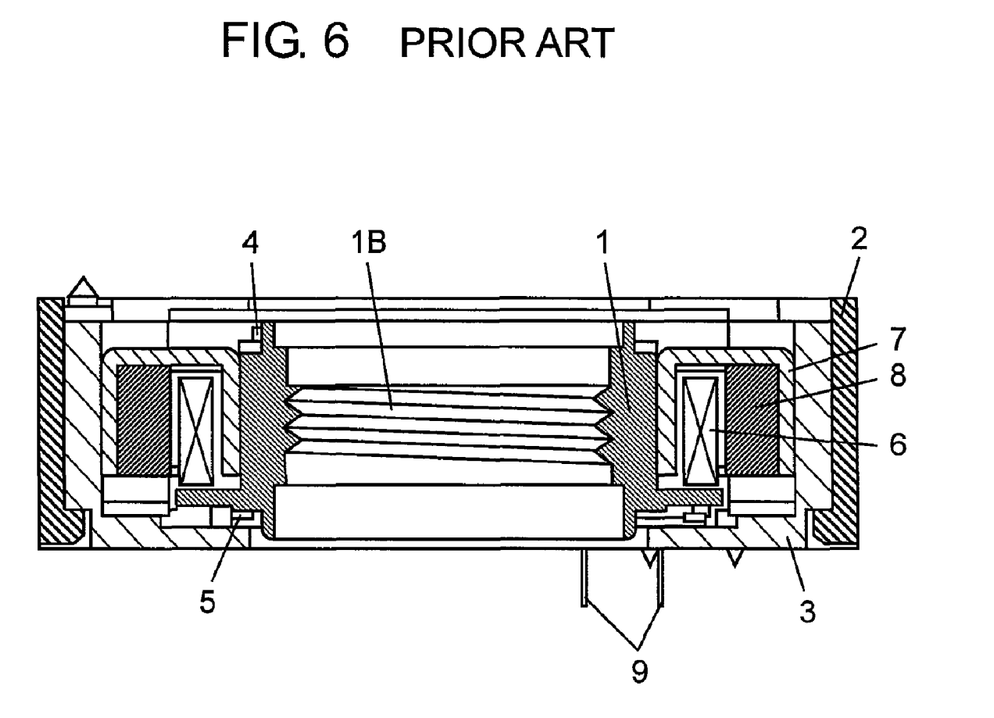
FIG. 6 is a sectional view of a conventional lens actuator.
Figure 7:
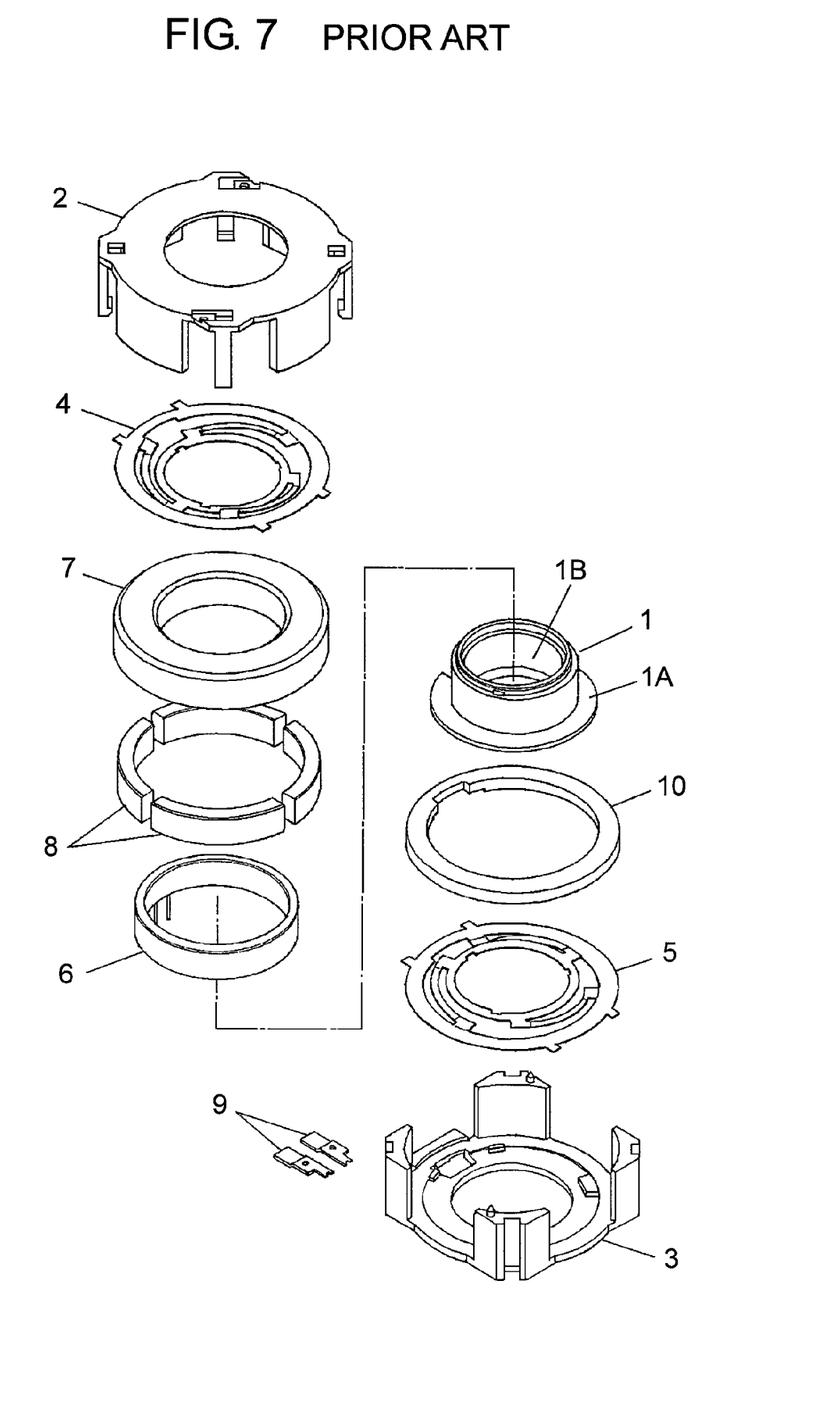
FIG. 7 is an exploded perspective view of the lens actuator shown in FIG. 6.

In recent years, electronic equipment, such as a camera and a mobile phone having a lens actuator with an auto-focusing function, has been put into widespread use. In response to such a trend, there has been growing demand for a lens actuator that offers simple assembly work and reliable performance. Here will be described a conventional lens actuator with reference to FIG. 6 and FIG. 7. FIG. 6 is a section view of a conventional lens actuator. FIG. 7 is an exploded perspective view of the lens actuator.

The lens actuator has carrier 1, cover 2, case 3, upper spring 4, lower spring 5, coil 6, yoke 7, a plurality of magnets 8, and spacer 10. Upper spring 4 and lower spring 5 are made of metallic thin plates. Carrier 1, cover 2, and case 3 are made of insulating resin. Carrier 1, which is formed into substantially a cylindrical shape, is situated between case 3 and cover 2 placed over the upper surface of case 3 so as to be movable in the vertical direction.

Upper spring 4 is disposed between the lower surface of cover 2 and the upper surface of carrier 1 in a slightly compressed condition. Lower spring 5 is disposed between the lower surface of carrier 1 and the inner bottom surface of case 3 in a slightly compressed condition. Upper spring 4 and lower spring 5 make a resilient contact with the upper surface and the lower surface, respectively, of carrier 1, thereby carrier 1 is held in a predetermined position.

Coil 6 is formed of a copper wire wound roundly. Coil 6 is fixed to flange 1A disposed at a lower section around the outer periphery of carrier 1. Yoke 7, which is made of iron or the like, is formed substantially in a cylindrical shape and has substantially a U-shape in section. Yoke 7 is disposed opposite to the outer periphery of carrier 1 so as to cover coil 6. The plurality of magnets 8, each of which has substantially an arc-shape, is attached on the inside wall of yoke 7.

The structure above forms a magnetic path from magnets 8 through yoke 7 and coil 6. Between the outer periphery of carrier 1 and yoke 7 and between coil 6 and magnets 8, predetermined clearances are formed for the movement of carrier 1 and coil 6 in the vertical direction.

Coil 6 has slack at its both ends for the vertical movement. Coil 6 is connected by soldering to electrodes 9, each of which is made of copper alloy or the like. The lower end of each of electrodes 9 downwardly protrudes from the bottom of case 3. Insulating resin-made spacer 10 is disposed above lower spring 5. The lens actuator is thus completed.

In the hollow section of carrier 1, screw-threaded groove 1B is formed so that the outer periphery of a lens barrel (not shown) is screwed therein, that is, the lens is fixed in carrier 1. The lens unit is thus structured. When the lens unit is mounted on electronic equipment, such as a camera and a mobile phone, electrodes 9 are connected to an electronic circuit (not shown) of the equipment via a lead wire, a connector or the like (not shown).

When a user operates a predetermined push button (not shown) of the equipment structured above, the electronic circuit of the equipment applies voltage to electrodes 9, thereby coil 6 carries electric current. Magnets 8 and yoke 7 form a magnetic field in the horizontal direction around coil 6. When electric current is flown into coil 6, coil 6 undergoes force perpendicular to the direction of the magnetic field, i.e., the force in the vertical direction. The force moves carrier 1 with coil 6 upward or downward, so that the focus of the lens mounted in carrier 1 is adjusted, i.e., the auto-focusing function is thus attained.

Upon the interruption of the current flow to coil 6, resilient force of upper spring 4 and lower spring 5 moves carrier 1 down to a predetermined position.

That is, upper spring 4 and lower spring 5 push the upper surface and the lower surface of carrier 1, respectively, so as to keep the lens barrel mounted in carrier 1 at a predetermined position. The application of voltage to coil 6 mounted on carrier 1 allows carrier 1 to move in the vertical direction. The auto-focusing function is thus attained.

As is described above, the lens actuator has the predetermined clearances between carrier 1 and yoke 7 and between coil 6 and magnets 8 so that carrier 1 is movable in the vertical direction. In the process of screwing the lens-equipped lens barrel into groove 1B, the screwing force inconveniently rotates carrier 1 due to the clearances and therefore the lens barrel is hard to be properly mounted therein. Therefore, the lens barrel has to be slowly screwed in groove 1B while carrier 1 is prevented from rotating by a wire-like tool. The manufacturing process needs extra time and effort.

SUMMARY OF THE INVENTION

The present invention provides a lens actuator with easy mounting of the lens barrel and reliable performance, a lens unit using the lens actuator, and a method for manufacturing the lens unit. The present invention also provides a method for mounting a lens-equipped lens barrel in the lens actuator.

The lens actuator of the present invention has a carrier, a cover, a first spring, a second spring, a coil, and a magnet. The carrier with a cylindrical shape is provided with a hollow section formed along a first direction, and has a holding section formed on one side of the first direction. The hollow section has a shape configured to mount a lens barrel therein. The cover is disposed on the side having the holding section of the carrier. The cover has a supporting section at a position that meets with the holding section of the carrier. The first spring and the second spring make a resilient contact with each of both surfaces in the first direction of the carrier. The coil is circumferentially disposed on the carrier so as to face the magnet. Of the coil and the magnet, one is mounted on the carrier and the other is disposed on the outer periphery or the inner periphery of the carrier. According to the structure above, the lens barrel, i.e., the lens is easily mounted in the carrier in a way that a holding pin is engaged with the holding section of the carrier and the supporting section of the cover. This allows the lens to be easily mounted in a short time because the carrier is prevented from rotating. The structure provides a lens unit with reliable performance.

DETAILED DESCRIPTION OF THE INVENTION

Figure 1:
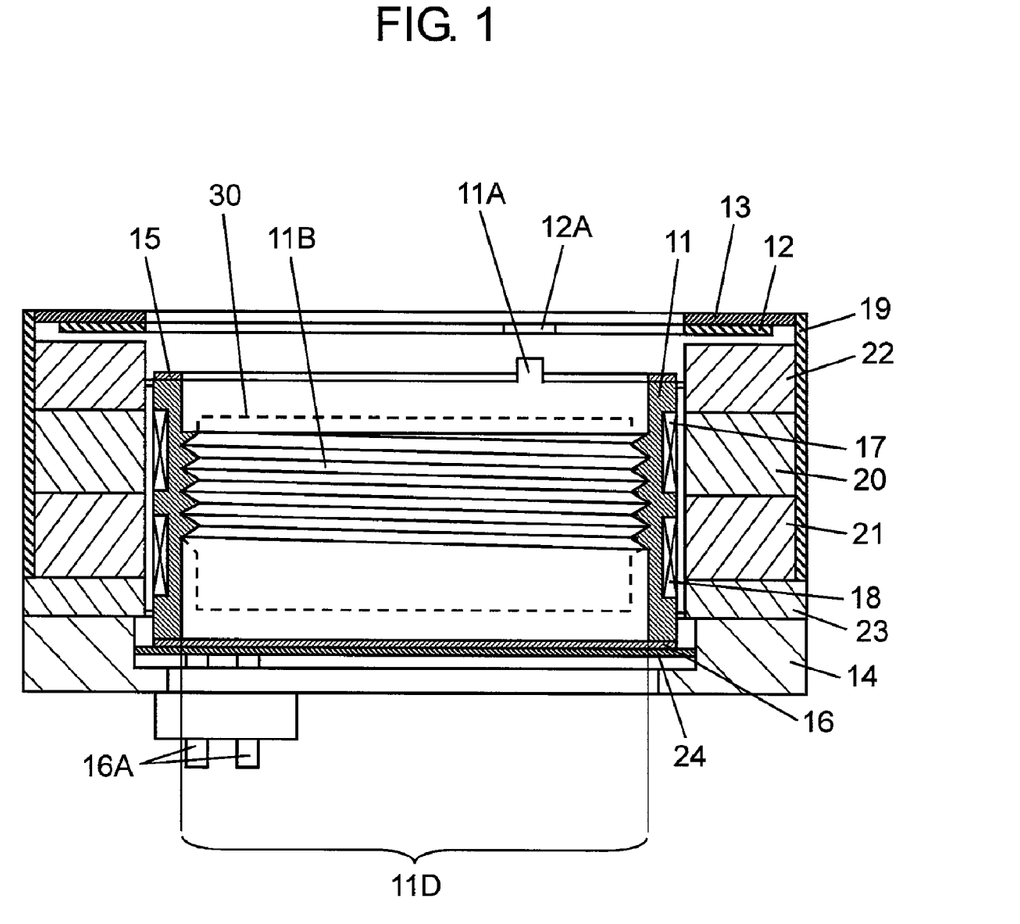
FIG. 1 is a sectional view of a lens actuator in a lens unit in accordance with an exemplary embodiment of the present invention.
Figure 2:
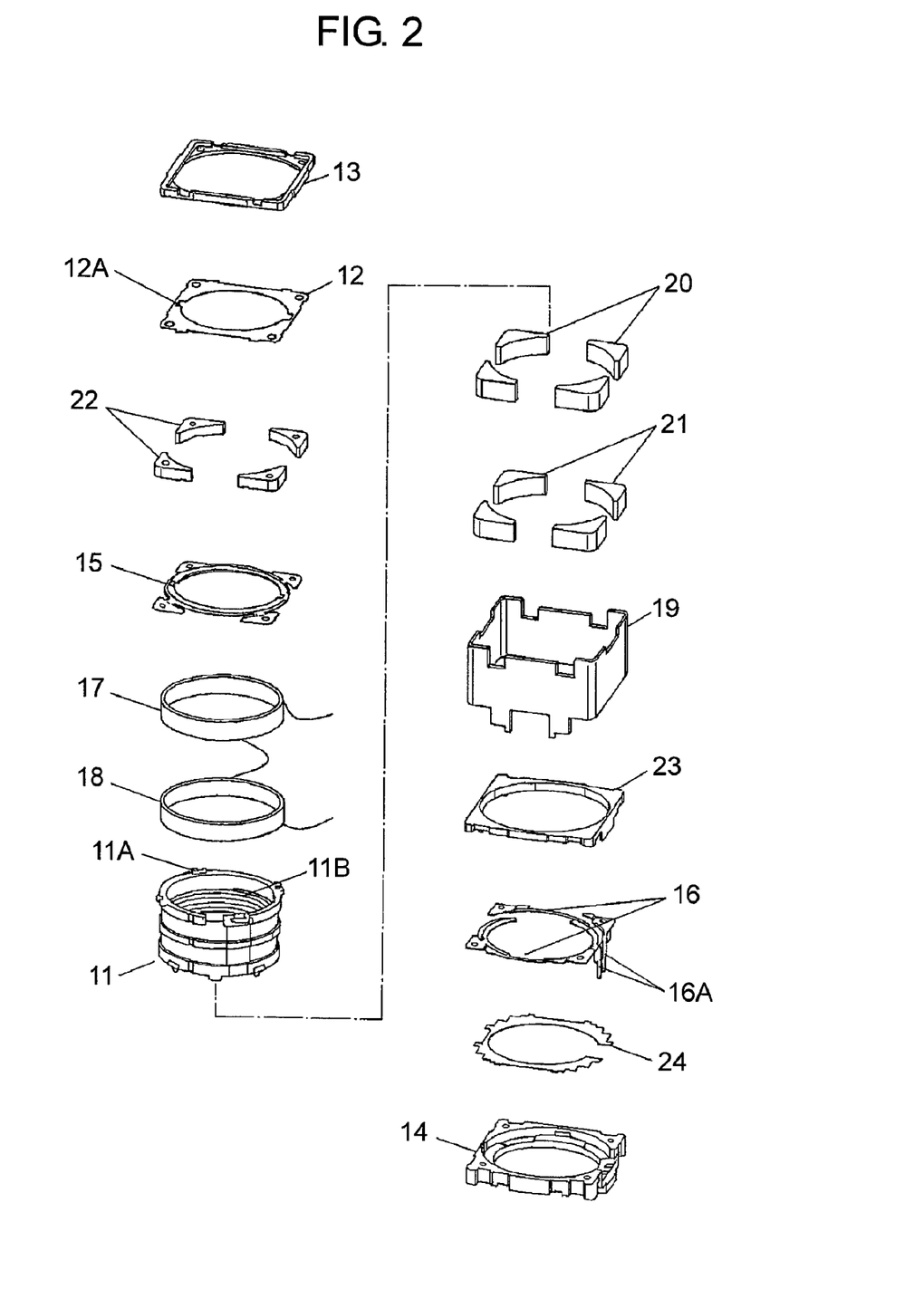
FIG. 2 is an exploded perspective view of the lens actuator shown in FIG. 1.

FIG. 1 is a sectional view of a lens actuator in a lens unit in accordance with an exemplary embodiment of the present invention. FIG. 2 is an exploded perspective view of the lens actuator.

The lens actuator has carrier 11, cover 12, upper spring 15 as a first spring, lower spring 16 as a second spring, upper coil 17, lower coil 18, and magnets 20, 21. The lens actuator further contains upper case 13, lower case 14, yoke 19, upper spacer 22, lower spacer 23, and shield plate 24.

Carrier 11 with a cylindrical shape is provided with hollow section 11D formed along the direction of its height. Hollow section 11D is formed with screw-threaded groove 11B having a shape suitable for lens-equipped lens barrel 30 to be screwed therein. Lens barrel 30 is made of insulating resin and is formed in a cylindrical shape. Lens barrel 30 accommodates a plurality of lenses (not shown) therein and has a screw section on the outer periphery so as to fit with screw-threaded groove 11B. On the upper surface of carrier 11, holding section 11A, which is substantially formed into a pair of walls, protrudes upwardly. That is, carrier 11 has hollow section 11D formed along a first direction and holding section 11A disposed on one side of the first direction. Hollow section 11D has a shape for mounting lens barrel 30 therein. Carrier 11 is made of insulating resin, such as polycarbonate containing glass. The section of lens barrel 30 is not shown in FIG. 1; instead, the outline of lens barrel 30 is represented by broken lines.

Cover 12 with an opening is disposed above carrier 11 on the side having holding section 11A of carrier 11. Supporting section 12A is formed on the periphery of the opening of cover 12 at a position that meets with holding section 11A. Cut out substantially into a rectangular, supporting section 12A has a width larger than that of holding section 11A. That is, cover 12 has supporting section 12A, whose shape can be engage with that of holding section 11A, at a position that meets with holding section 11A of carrier 11. Although holding section 11A is shaped into a protrusion and supporting section 12A is shaped into a notch in the structure above, it is not limited to; their shapes may be the other way around. Cover 12 is formed of, for example, a nickel-coated steel plate.

Upper spring 15 makes a resilient contact with the upper surface of carrier 11, while a plurality of lower springs 16 make a resilient contact with the lower surface of carrier 11. To be specific, upper spring 15 is disposed between the lower surface of cover 12 and the upper surface of carrier 11 in a slightly compressed condition, and lower springs 16 are disposed between the lower surface of carrier 11 and the upper surface of lower case 14 in a slightly compressed condition. Upper spring 15 and lower springs 16 retain carrier 11 at a predetermined position in the vertical direction. As described above, upper spring 15 and lower springs 16 make a resilient contact with the upper and the lower surfaces, respectively, in the first direction of carrier 11. Upper spring 15 and lower springs 16 are, for example, formed of metallic thin plates of steel or copper alloy.

Each of upper coil 17 and lower coil 18 is formed of an insulating resin-coated copper wire wound roundly. Each of upper coil 17 and lower coil 18 is formed of a single copper wire wound in the reverse direction to each other. Upper coil 17 and lower coil 18 are circumferentially attached on the outer periphery of carrier 11 by adhesive or the like, with the lower end of upper coil 17 and the upper end of lower coil 18 connected via a predetermined clearance. Upper coil 17 and lower coil 18 are disposed in the circumferential direction of carrier 11.

Yoke 19 is disposed on the outer periphery of carrier 11 and covers the side surface of carrier 11. Yoke 19 has substantially a box shape made of iron or the like. Four magnets 20 are stacked on four magnets 21 in the four corners of the inner periphery of yokes 19. Magnets 20 and 21 are neodymium-based magnets formed substantially into an arc shape. Magnets 20 and magnets 21 face upper coil 17 and lower coil 18, respectively, on the outer periphery of carrier 11, with a predetermined clearance for vertical movement of carrier 11 formed therebetween.

Magnets 20 are stacked on magnets 21, with the polarity reversed, and disposed in each corner of the inner periphery of yoke 19. For example, magnets 20 located on the upper side have the inner periphery of the north pole and the outer periphery of the south pole, whereas magnets 21 located on the lower side have the inner periphery of the south pole and the outer periphery of the north pole. The arrangement of the magnets establishes the magnetic path from magnets 20, 21 through yoke 19 to upper coil 17 and lower coil 18.

Upper case 13 and lower case 14 are made of insulating resin, such as polyphthalamide. Upper case 13 is disposed over the upper surface of cover 12. Carrier 11 is disposed between cover 12 and lower case 14 so as to be movable in the vertical direction.

Each of upper spacers 22 has substantially an arc shape. Lower spacer 23 has a through hole in the center. They are made of insulating resin, such as polyphthalamide. Shield plate 24 is made of, for example, a nickel-coated steel plate. The four pieces of upper spacer 22 are placed at each corner between cover 12 and upper spring 15. Lower spacer 23 is disposed on the upper side of lower springs 16, and shield plate 24 is disposed on the lower side of lower springs 16.

The upper end of upper coil 17 and the lower end of lower coil 18 are electrically connected to lower springs 16 by soldering or the like. Lower springs 16 have downwardly bent terminal section 16A, which protrudes outside the outer bottom of lower case 14. The lens actuator is thus structured. Although lower springs 16 are employed for the structure of the embodiment because lower springs 16 also serve as terminals, the lower spring may be formed as a single piece. In that case, the lens actuator needs additional terminals to be connected to the upper end of upper coil 17 and the lower end of lower coil 18.

Figure 3:
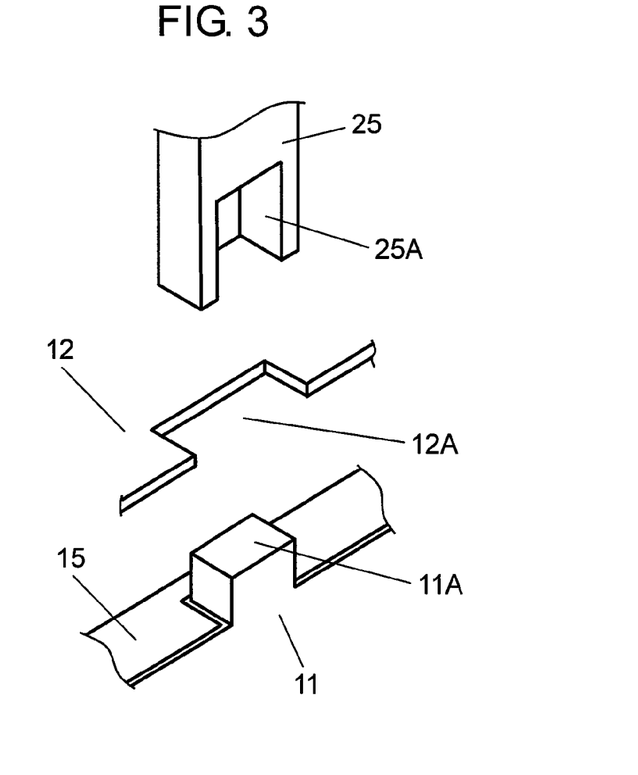
FIG. 3 is a partial perspective view showing the lens actuator of FIG. 1.
Figure 4:
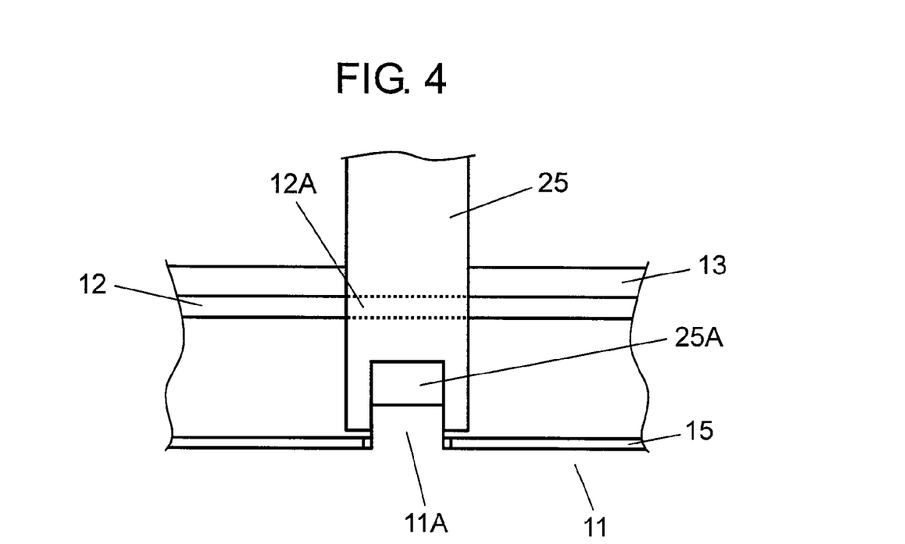
FIG. 4 is a partial plane view showing the lens actuator of FIG. 1.

Mounting lens barrel 30 in hollow section 11D of carrier 11 allows a lens unit to be structured. The mounting procedures of lens barrel 30 in hollow section 11D will be described with reference to FIG. 3 and FIG. 4. FIG. 3 is a partial perspective view showing the lens actuator of FIG. 1. FIG. 4 is a partial plane view showing the lens actuator.

To mount the lens barrel in the lens actuator, a worker follows the procedures below using holding pin 25. Holding pin 25 is formed substantially into a rectangular column and has recess section 25A in the center of its lower section.

inserting holding pin 25 into the opening of upper case 13 from the upper direction;

preventing carrier 11 from rotating in a way that the outer surface of holding pin 25 is fitted with supporting section 12A of cover 12, and at the same time, the inner surface of recess section 25A is engaged with holding section 11A of carrier 11;

inserting lens barrel 30, with the engagement above maintained, into hollow section 11D of carrier 11 and screwing the screw section disposed on the outer periphery of lens barrel 30 in screw-threaded groove 11B.

Through the procedures above, lens barrel 30 is attached to the inner periphery of carrier 11 and the lenses are mounted in carrier 11. That is, by virtue of holding pin 25, lens barrel 30 is easily mounted in carrier 11 being prevented from rotating.

According to the structure, wall-shaped holding section 11A is disposed on the upper surface of carrier 11. On cover 12 that is disposed above carrier 11, notch-like supporting section 12A is disposed so as to meet with holding section 11A. In the mounting procedures, the outer surface of holding pin 25 is fitted with supporting section 12A and the inner surface of recess section 25A is engaged with holding section 11A. In this way, holding pin 25 enables the worker to mount lens barrel 30 in carrier 11 under the condition with no unwanted rotation of carrier 11.

As described earlier, the lens actuator has a predetermined clearance between magnets 20, 21 and carrier 11 so that carrier 11 is movable in the vertical direction. When lens barrel 30 is mounted in carrier 11, using holding pin 25 prevents carrier 11 from rotating. By virtue of the engagement provided by holding pin 25, carrier 11 is insensitive to the force for screwing lens barrel 30 in carrier 11. As a result, lens barrel 30 can be mounted in carrier 11 in a quick and easy way.

When such structured lens unit is mounted on electronic equipment, such as a camera and a mobile phone, a plurality of terminal sections 16A are connected to an electronic circuit (not shown) of the equipment via a lead wire, a connector or the like (not shown).

When the user operates a predetermined push button (not shown) of the electronic equipment structured above, the electronic circuit of the equipment applies voltage to terminal sections 16A, thereby upper coil 17 and lower coil 18 carry electric current. Magnets 20, 21 and yoke 19 form magnetic field in the horizontal direction around upper coil 17 and lower coil 18. When electric current is flown into upper coil 17 and lower coil 18, they undergo force perpendicular to the direction of the magnetic field, i.e., the force in the vertical direction. The force moves upper coil 17, lower coil 18, i.e., moves carrier 11 accommodating the coils upward or downward, so that the focus of the lens is adjusted. The auto-focusing function of the lenses is thus attained.

Upon the interruption of the current flow to upper coil 17 and lower coil 18, resilient force of upper spring 15 and lower spring 16 moves carrier 11 to a predetermined position.

That is, upper spring 15 and lower spring 16 push the upper surface and the lower surface of carrier 11, respectively, so as to keep lens barrel 30 attached to carrier 11 at a predetermined position. The application of voltage to upper coil 17 and lower coil 18 attached to carrier 11 allows carrier 11 to move in the vertical direction. The auto-focusing function of the lenses is thus attained.

As described earlier, upper coil 17 and lower coil 18 are so formed that a single copper wire is wound in the reverse direction to each other in each coil. They are disposed on the outer periphery of carrier 11. Besides, magnets 20 and 21 are disposed, with the opposite polarity faced, on the outer periphery in a way that magnets 20 and magnets 21 face upper coil 17 and lower coil 18, respectively. As described above, strong magnetic force generated between the plurality of coils and magnets allows carrier 11 to move up or down, which moves lens-equipped lens barrel 30 with reliability. Although the structure employs more-than-one combination of the coil and the magnet, the auto-focusing function of the lenses is attained by a single combination of them.

The aforementioned description has focused on the structure in which holding section 11A is disposed on the upper surface of carrier 11 so as to protrude upwardly and supporting section 12A is cut out on the opening of cover 12. However, the present invention is not limited to the structure above. The holding section and the supporting section may be structured as is in the partially shown perspective view of FIG. 5. According to the structure, a plurality of square recesses as holding sections 11C are disposed on the upper surface of carrier 11 so as to extend downwardly, on the other hand, inwardly protruding supporting section 12C is disposed on the opening of cover 12 at a position that meets with holding sections 11C.

Figure 5:
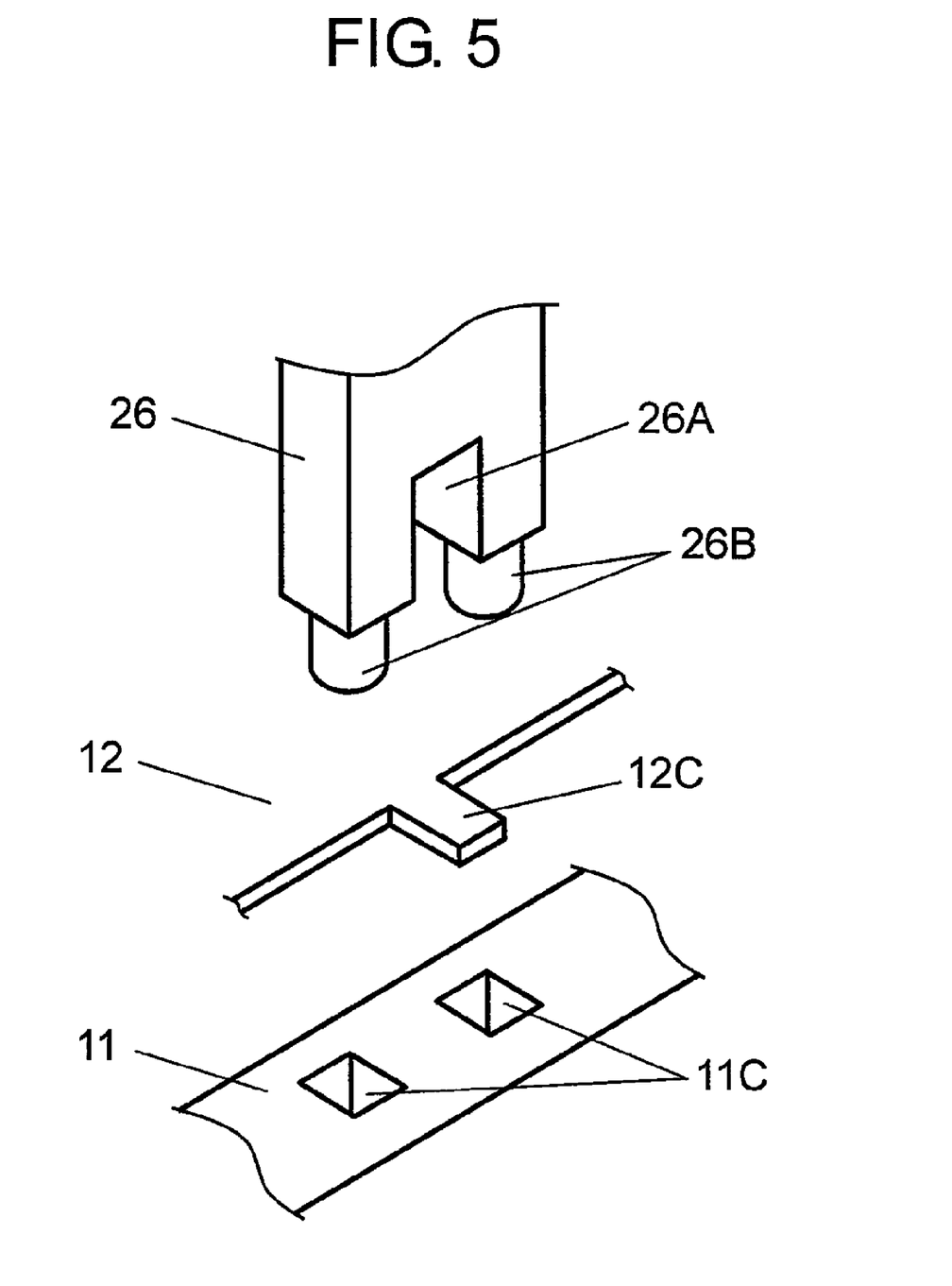
FIG. 5 is a partial perspective view showing another lens actuator of the exemplary embodiment of the present invention.

In that case, holding pin 26 is used. Holding pin 26 has notch 26A formed in the low center and a plurality of protrusions 26B of substantially a cylindrical shape disposed at the bottom. In the mounting process of lens barrel 30, a worker uses holding pin 26 in a manner that the inner face of notch 26A is fitted with both edges of supporting section 12C and protrusions 26B are inserted into holding sections 11C. In this way, the worker easily mounts lens barrel 30 in carrier 11 being prevented from rotating.

For example, a structure of cover 12 and upper spring 15 may prevent carrier 11 from rotating in some cases of the other structure. In that case, however, an application of strong force can cause distortion of upper spring 15 and the like. In contrast, according to the structure of the embodiment where holding pin 25 or 26 prevents carrier 11 from rotating, lens barrel 30 is reliably mounted in carrier 11 without distortion of upper spring 15 and the like.

Although the explanation has been given on a structure where upper coil 17 and lower coil 18 are mounted on carrier 11 and magnets 20, 21 are disposed on the outer periphery of carrier 11 so as to face the coils, the present invention is not limited to the structure. As another possibility, magnets 20, 21 may be mounted on carrier 11 and upper coil 17 and lower coil 18 may be disposed on the periphery of carrier 11. Further, a coil and a magnet may be oppositely disposed on the inner periphery of carrier 11. The arrangement makes the structure complicated a little. In that case, the position of the coil and the magnet should be determined lower than that of lens barrel 30 in a manner which does not interfere with the mounting work of lens barrel 30. That is, the coil is disposed in the circumferential direction of carrier 11 and the magnet is disposed opposite to the coil. Of the coil and the magnet, one is mounted on carrier 11 and the other is disposed on the outer or inner periphery of carrier 11.

Although the explanation above has been given on a structure where lens barrel 30 is screwed in screw-threaded groove 11B of hollow section 11D of carrier 11, the present invention is not limited to the structure. That is, the present invention is widely applicable to structures where the lens barrel is fixed, with rotative engagement, in the hollow section of carrier 11. For example, at the mounting position of the lens barrel in the hollow section of carrier 11, a pair of intermediate walls, each of which has a round hole, is oppositely disposed in a direction of optical axis. Outwardly extending notches are formed with an equal pitch angle around one of the round holes. On the other hand, the outer periphery of the lens barrel has protrusions that meet with the notches. In the mounting process, the protrusions are inserted into the notches and then the lens barrel is fixed, with rotative engagement, to the carrier. As another possibility, the lenses may be mounted in carrier 11 in a manner that lens barrel 30 is engaged with a single-line groove or a plurality of dot-shaped pits and projections formed in the hollow section of carrier 11. The present invention has a great effect on the structure where lens barrel 30 is screwed in carrier 11 or the structure where lens barrel 30 is fixed with rotative engagement to carrier 11. However, the concept of the present invention may be applicable to a structure other than those described above so as to suppress an unwanted rotation of the lens barrel in the mounting work.

As described above, the lens actuator, the lens unit using the lens actuator and the method for manufacturing the lens unit of the present invention offer the structure with easy manufacturing process and reliable performance. It is therefore suitable for the actuator mainly used for a camera and a mobile phone.

What is claimed is:

1. A lens actuator comprising:
   a carrier with a cylindrical shape provided with a hollow section formed along a first direction, the hollow section having a shape configured to mount a lens barrel therein, the carrier including a holding section formed on one side of the first direction;
   a cover disposed on a side of the carrier where the holding section is formed, and having a supporting section disposed so as to meet with the holding section, wherein the cover is provided with an opening and the supporting section is formed in the opening, and wherein one of the holding section and the supporting section is a protrusion and the other of the holding section and the supporting section is a recess wherein the protrusion and the recess engage one another in order to prevent the carrier from moving relative to the cover;
   a first spring and a second spring having a resilient contact with an upper surface and a lower surface in the first direction of the carrier, respectively;
   a coil disposed in a circumferential direction of the carrier; and
   a magnet disposed opposite to the coil,
   wherein, of the coil and the magnet, one is mounted on the carrier and another is disposed on an outer periphery or an inner periphery of the carrier.

2. The lens actuator of claim 1 wherein the carrier includes an internal thread as the shape configured to mount the lens barrel.

3. A lens unit comprising:
   a carrier with a cylindrical shape provided with a hollow section formed along a first direction, and having a holding section formed on one side of the first direction;
   a lens barrel inserted into the hollow section of the carrier and mounted in the hollow section;
   a cover disposed on a side of the carrier where the holding section is formed, and having a supporting section disposed so as to meet with the holding section, wherein the cover is provided with an opening and the supporting section is formed in the opening, and wherein one of the holding section and the supporting section is a protrusion and the other of the holding section and the supporting section is a recess wherein the protrusion and the recess engage one another in order to prevent the carrier from moving relative to the cover;
   a first spring and a second spring having a resilient contact with an upper surface and a lower surface in the first direction of the carrier, respectively;
   a coil disposed in a circumferential direction of the carrier; and
   a magnet disposed opposite to the coil,
   wherein, the hollow section has a shape configured to mount the lens barrel therein, and of the coil and the magnet, one is mounted on the carrier and another is disposed on an outer periphery or an inner periphery of the carrier.

4. The lens unit of claim 3 wherein the carrier includes an internal thread so as to mount the lens barrel.

5. A method for mounting a lens barrel in a lens actuator, wherein, the lens actuator having:
   a carrier with a cylindrical shape provided with a hollow section formed along a first direction, the hollow section having a shape configured to mount a lens barrel therein, the carrier including a holding section formed on one side of the first direction;
   a cover disposed on a side of the carrier where the holding section is formed, and having a supporting section disposed so as to meet with the holding section, wherein one of the holding section and the supporting section is a protrusion and the other of the holding section and the supporting section is a recess wherein the protrusion and the recess engage one another in order to prevent the carrier from moving relative to the cover;
   a first spring and a second spring having a resilient contact with an upper surface and a lower surface in the first direction of the carrier, respectively;
   a coil disposed in a circumferential direction of the carrier; and
   a magnet disposed opposite to the coil,
   wherein, of the coil and the magnet, one is mounted on the carrier and another is disposed on an outer periphery or an inner periphery of the carrier,
   the method comprising:
   engaging a holding pin with the recess and the protrusion of the holding section of the carrier and the supporting section of the cover thereby preventing the carrier from rotating; and
   mounting the lens barrel in the hollow section of the carrier, with the carrier being prevented from rotating.

6. The method of claim 5 wherein the carrier includes an internal thread as the shape configured to mount the lens barrel and wherein mounting of the lens barrel in the hollow section of the carrier comprises threading the lens barrel in the internal thread of the carrier.

7. The method of claim 5 wherein the cover is provided with an opening and the supporting section is formed on a periphery of the opening of the cover.

8. A method for manufacturing a lens unit, wherein, the lens unit having:
   a carrier with a cylindrical shape provided with a hollow section formed along a first direction, and having a holding section formed on one side of the first direction;
   a lens barrel inserted into the hollow section of the carrier and mounted in the hollow section;
   a cover disposed on a side of the carrier where the holding section is formed, and having a supporting section disposed so as to meet with the holding section, wherein one of the holding section and the supporting section is a protrusion and the other of the holding section and the supporting section is a recess wherein the protrusion and the recess engage one another in order to prevent the carrier from moving relative to the cover;
   a first spring and a second spring having a resilient contact with an upper surface and a lower surface in the first direction of the carrier, respectively;
   a coil disposed in a circumferential direction of the carrier; and
   a magnet disposed opposite to the coil, wherein, the hollow section has a shape configured to mount the lens barrel therein, and of the coil and the magnet, one is mounted on the carrier and another is disposed on an outer periphery or an inner periphery of the carrier, the method comprising:

engaging a holding pin with the recess and the protrusion of the holding section of the carrier and the supporting section of the cover thereby preventing the carrier from rotating; and mounting the lens barrel in the hollow section of the carrier, with the carrier being prevented from rotating.

9. The method of claim 8 wherein the carrier includes an internal thread and wherein mounting of the lens barrel in the hollow section of the carrier comprises threading the lens barrel in the internal thread of the carrier.

10. The method of claim 8 wherein the cover is provided with an opening and the supporting section is formed on a periphery of the opening of the cover.

* * * * *